(12) United States Patent
Phillips et al.

(10) Patent No.: US 6,934,844 B2
(45) Date of Patent: Aug. 23, 2005

(54) SECURE COMMUNICATIONS FOR A CURRENCY HANDLING MACHINE

(75) Inventors: Carl Alexander Phillips, West Chester, PA (US); Gaston Baudat, Geneva (CH); Didier Rossel, Grand-Lancy (CH); Bob Mackenzie, West Chester, PA (US); Gregory John Billington, Reading (GB)

(73) Assignee: Mars Incorporated, McLean, VA (US)

( * ) Notice: Subject to any disclaimer, the term of this patent is extended or adjusted under 35 U.S.C. 154(b) by 607 days.

(21) Appl. No.: 10/025,101

(22) Filed: Dec. 19, 2001

(65) Prior Publication Data

US 2002/0091648 A1 Jul. 11, 2002

Related U.S. Application Data

(60) Provisional application No. 60/258,099, filed on Dec. 22, 2000.

(51) Int. Cl.[7] ................................................. H04L 9/00
(52) U.S. Cl. ........................................ 713/170; 705/67
(58) Field of Search ............................. 705/35, 64, 67; 194/206–208; 713/170, 176; 209/534

(56) References Cited

U.S. PATENT DOCUMENTS

| | | | |
|---|---|---|---|
| 5,464,087 A | 11/1995 | Bounds et al. | |
| 5,737,418 A | 4/1998 | Saffari et al. | 713/176 |
| 5,918,720 A | 7/1999 | Robinson et al. | 194/206 |
| 5,933,816 A | * 8/1999 | Zeanah et al. | 705/35 |
| 6,081,206 A | 6/2000 | Kielland | |
| 6,092,629 A | 7/2000 | Bohnert et al. | |
| 6,116,402 A | 9/2000 | Beach et al. | |
| 6,125,988 A | 10/2000 | Waters | |
| 6,186,339 B1 | * 2/2001 | Saltsov et al. | 209/534 |
| 6,223,876 B1 | * 5/2001 | Walsh et al. | 194/207 |
| 6,321,894 B1 | 11/2001 | Johnsson | 194/208 |
| 6,722,986 B1 | * 4/2004 | Lyons et al. | 713/176 |

FOREIGN PATENT DOCUMENTS

AU     98 91344     *    5/1999

OTHER PUBLICATIONS

"Treasury plan may alter EFT processing: Directive would require use of Message Authentication Procedure by 1988", Ferris, American Banker(Oct. 1, 1984) p. 1.*

* cited by examiner

Primary Examiner—Salvatore Cangialosi
(74) Attorney, Agent, or Firm—Fish & Richardson P.C.

(57) ABSTRACT

A method and apparatus for securing communications in a currency-handling machine. The method includes generating an encrypted transaction message based on a bill acceptor transaction event, communicating the encrypted transaction message to a transaction controller, decrypting the encrypted transaction message and enabling the bill acceptor to accept bills.

33 Claims, 7 Drawing Sheets

FIG. 7

SECURE COMMUNICATIONS FOR A CURRENCY HANDLING MACHINE

This application claims priority from U.S. Provisional Patent Application No. 60/258,099 filed Dec. 22, 2000.

BACKGROUND OF THE INVENTION

This invention relates to communication protocols used in currency-handling machines. More specifically, the invention relates to a secured communication protocol including algorithms to encrypt, decrypt, and authenticate a transaction message between a bill acceptor and a transaction controller in a currency-handling machine.

Many currency-handling machines provide vending and gaming related goods and services. A customer purchases these goods and services by inserting currency such as bills into the currency-handling machine in exchange for these goods or services. The currency-handling machine is typically comprised of a bill acceptor connected to a transaction controller over a communication channel. The currency-handling machine may also include a coin acceptor which validates coins in a similar manner, and/or other types of currency validators. So for ease of discussion, any comments referring to a bill acceptor also applies to a coin acceptor. The bill acceptor validates the bill to determine whether it is counterfeit or otherwise bona-fide and then whether to accept or reject the bill. If the bill acceptor determines that the bill is valid, then it communicates this event as a transaction message to be sent to the transaction controller. The bill acceptor accomplishes this task by generating and formatting a transaction message and sending it to the transaction controller over the communications channel. The transaction controller processes the transaction message by determining whether the content of the message sent by the bill acceptor is valid based on additional criteria. If the transaction controller determines that the transaction message is legitimate, it responds to the bill acceptor by sending an acknowledgement type message over the communications channel.

Current currency-handling machines employ a communications channel between the bill acceptor and the transaction controller that is unsecured and thus vulnerable to unauthorized access. Typically, the bill acceptor and the transaction controller are proprietary units and are installed by authorized personnel during a setup process. However, after the authorized installation is complete, the currency-handling machine may be vulnerable to tampering. Since a transaction message sent by a bill acceptor over the communications channel may not be secure, an unauthorized person with this knowledge may be able to replace the bill acceptor with an unauthorized bill acceptor. Then the unauthorized bill acceptor could be programmed to replicate a transaction message that would have been sent by the original, legitimate bill acceptor. Since the transaction controller lacks a mechanism for determining the validity of the transaction message, the unauthorized bill acceptor unit is able to convince the transaction controller that it is the authorized bill acceptor. Thus, the transaction controller is duped into generating a credit based on a fraudulent transaction, thus permitting a thief to steal a good or service. The currency-handling machine thus has no mechanism for authenticating the source of the transaction message and determining whether a transaction message originated from the original authorized bill acceptor. In addition, an unauthorized bill acceptor may be programmed to record one transaction message and then continuously send the same message to the transaction controller. Since the currency-handling machine lacks the ability to detect this type of activity, the currency-handling machine responds by continuously issuing credit in response to the unauthorized bill acceptor. If the currency-handling machine is a gaming machine, multiple game credits may be generated that eventually will enable the thief to obtain a jackpot payout of money.

In light of the foregoing, there is a need for a currency-handling machine capable of providing secure communications by employing a secure communication protocol in order to communicate transaction messages between a bill acceptor and a transaction controller.

SUMMARY OF THE INVENTION

The present invention relates to secured communications in a currency-handling machine. The invention provides a secured communication protocol with the capability of encrypting/decrypting and authenticating transaction messages between a bill acceptor and a transaction controller.

In general, according to one aspect, the present invention features a method for securing communications in a currency-handling machine including generating an encrypted transaction message based on a transaction event originating from the bill acceptor, communicating the encrypted transaction message from the bill acceptor to a transaction controller over a communication channel, decrypting the encrypted transaction message within the transaction controller, and enabling the bill acceptor to accept a bill if the decrypted transaction message is authenticated.

This implementation may include one or more of the following features. Generating the encrypted transaction message may include applying an exclusive-or operation on at least one of a transaction message, a master-key, and a certification-key. The master-key maybe a predetermined value originating from the bill acceptor and communicated from the bill acceptor to the transaction controller over the communication channel during the initialization phase. The certification-key may be a random value periodically communicated from the transaction controller to the bill acceptor over the communication channel. Decrypting the transaction message may include decrypting the encrypted transaction message by applying an exclusive-or operation on at least one of a encrypted transaction message, a master-key, and a certification-key. Decrypting the checksum of the encrypted transaction message, disabling the bill acceptor if the result of the checksum fails, and sending an acknowledgement message it the result of the checksum passes. Generating the encrypted transaction message may include applying to the transaction a modulus-based operation and using a private-key known only to the bill acceptor and a certification-key received during a previous communication with the transaction controller. Decrypting may also include applying to the encrypted transaction message a modulus-based operation and using a public key communicated from the bill acceptor to the transaction controller, wherein the result of the operation is an authentication value used to authenticate the source of the encrypted transaction message, and applying an additional modulus-based operation on the authentication value using the public-key and the certification-key, wherein the result of the operation is a data value used to evaluate the encrypted transaction message.

In general, according to another aspect, the present invention features a method for securely installing a bill acceptor in a currency-handling machine. The method includes connecting a bill acceptor to a transaction controller, enabling a secured setup mode to operate in the bill acceptor, transmitting a master-key code from the bill acceptor to the transaction controller, processing the master-key code in the transaction controller and generating a certification-key, and transmitting the certification-key to the bill-acceptor to enable the bill-acceptor to operate.

In general, according to another aspect, the present invention features a method of operating a currency-handling machine in a secure environment. The method includes generating an escrow message in response to an insertion of a bill into a bill acceptor; encrypting the escrow message using a secured communication protocol, wherein the escrow message is formatted based on information derived from the bill; communicating the encrypted escrow message from the bill acceptor to the transaction controller; decrypting the escrow message using a secured communication protocol; verifying the integrity of an escrow checksum of the decrypted escrow message; sending a stack command to the bill acceptor, wherein the stack command includes a new certification-key, if the result of an escrow checksum reveals an authorized bill acceptor; storing the bill and acknowledging the stack command by sending an encrypted stack message to the transaction controller; receiving the stack message into the transaction controller; decrypting the stack message using a secured communication protocol; verifying the integrity of a stack checksum of the decrypted stack message; and sending a credit command to the bill acceptor, wherein the credit command includes a new certification-key, if the result of the checksum reveals an authorized bill acceptor. The above implementations may further include generating a warning and disabling the bill acceptor if the result of at least one of the escrow checksum and the stack checksum reveals an unauthorized bill acceptor.

In yet another aspect of the invention, a method of securing communications between a bill acceptor and a transaction controller within a currency-handling machine and a bill acceptor is described. The method includes requesting a master-key from the bill acceptor during the setup process; transmitting a certification-key to the bill acceptor during the setup process; generating a formatted transaction message based on an event originating at the bill acceptor; retrieving the certification-key and the master-key at the bill acceptor; generating an encrypted transaction message based on a exclusive-or operation on at least one of the master-key and the certification-key at the bill acceptor; receiving the encrypted transaction message; decrypting the encrypted transaction message based on the exclusive-or operation on at least one of the master-key and the certification-key; and verifying and taking an appropriate action based on the integrity of the checksum of the result of decrypting the encrypted transaction message.

In general, according to another aspect of the invention, a method of securing communications between a bill acceptor and a transaction controller within a currency-handling machine includes transmitting a certification-key to the bill acceptor during the setup process; generating a public-key and a private-key within the bill acceptor; transmitting the public-key to the transaction controller; generating an encrypted transaction message based on the private-key and the certification-key; transmitting the encrypted transaction message to the transaction controller; decrypting the encrypted transaction message within the transaction controller based on the public-key; and verifying the authenticity of the encrypted transaction message using the certification-key.

In general, in yet another aspect, the invention features a method of securing communications between a bill acceptor and a transaction controller within a currency-handling machine. This method includes generating a certification-key at the bill acceptor during the setup process, wherein the certification-key is generated by a pseudo-random-generator with an initial seed value; receiving the initial seed value from the bill acceptor during the setup process; generating a certification-key during the setup process, wherein the certification-key is generated by a pseudo-random-generator with an initial seed value received from the bill acceptor; generating an encrypted transaction message at the bill acceptor based on the certification-key; decrypting the encrypted transaction message based on the certification-key, wherein the certification-key is generated by a pseudo-random-generator at the transaction controller; and verifying the authenticity of the encrypted transaction message by comparing the certification-key generated by the pseudo-random-generator in the transaction controller with the certification-key obtained from encrypted transaction message. An added feature may be that a certification-key may be subsequently generated at the bill acceptor when a subsequent transaction message is encrypted, and a certification-key may be subsequently generated at the transaction controller when the subsequent transaction message is received and decrypted.

In general, according to yet another aspect, the invention features a method of securing communications between a bill acceptor and a transaction controller within a currency-handling machine including, generating at the bill acceptor a current-key and a future-key during the setup process; receiving the future-key during the setup process; storing the future-key during the setup process; generating at the bill acceptor an encrypted transaction message based on the current-key and the future-key; decrypting the encrypted transaction message based on the future-key, where the future-key is retrieved from the previously stored future-key; and verifying the authenticity of the encrypted transaction message by comparing the future-key which was previously obtained and retrieved from the transaction controller with the current-key obtained from the encrypted transaction message. A feature of this method may be that decrypting includes obtaining from the encrypted transaction message a future-key and storing the future-key at the transaction controller to be used when decrypting a subsequent transaction message containing a current-key and a new future-key, and wherein the current-key obtained from the subsequent decrypted transaction message is to be compared with the future-key previously stored at the transaction controller. Another aspect of the invention features a secure bill handling apparatus. The apparatus includes a bill acceptor including a processor and memory for authenticating bills and generating and encrypting data, and a transaction controller connected to the bill acceptor, wherein the transaction controller is associated with the currency-handling machine, and wherein the transaction controller includes a processor and memory for decrypting and authenticating data received by the bill acceptor, and responding to the bill acceptor based on the result of the authenticity of the data received from the bill acceptor. The apparatus may include one or more of the following features. The bill acceptor may encrypt the transaction message based on the exclusive-or operation using a master-key and a certification-key, and the transaction controller may decrypt the encrypted transaction message based on the exclusive-or operation using the master-key and the certification-key. Alternatively, the bill acceptor may generate an encrypted transaction message based on a private-key and a certification-key, and the transaction controller may decrypt the encrypted transaction message based on the public-key.

The invention may also provide one or more of the following advantages. The use of a secured communication protocol in a currency-handling machine provides a secured communication channel between a bill acceptor and a transaction controller within the currency-handling machine. This decreases the occurrence of fraudulent events in a currency-handling machine by increasing the level of security thieves must overcome to gain access to the currency-handling machine. This increased level of security is achieved through the use of a secured communication protocol which includes algorithms to encrypt, decrypt, and authenticate transaction messages between a bill acceptor and a transaction controller.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
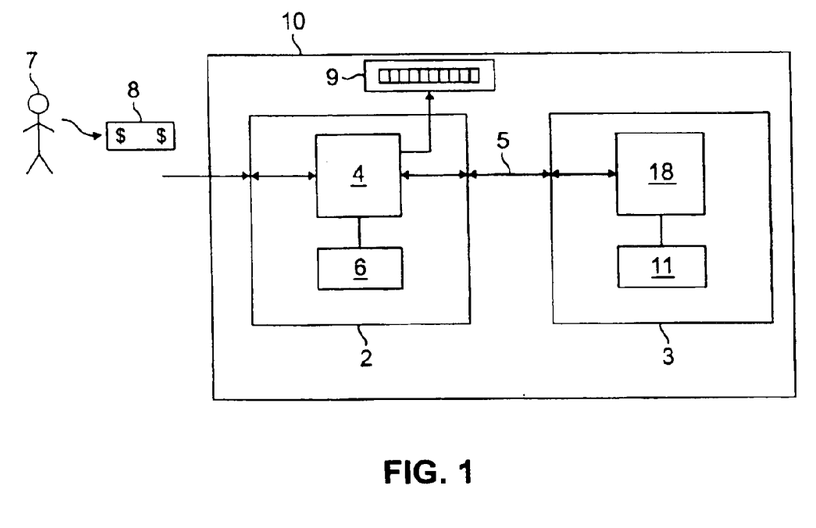
FIG. 1 is a diagram illustrating a currency-handling machine according to the present invention.

FIG. 1 illustrates a currency-handling machine 10, which may be a gaming or vending machine, that includes a bill acceptor 2 connected to a transaction controller 3 over a communication channel 5. A customer 7 desiring to use the currency-handling machine 1 for gaming or vending purposes, inserts a bill 8 into the bill acceptor 2. The term currency as used herein generally pertains to any and all forms of currency or legal tender including security documents, paper currency such as bills, coins, tokens, smart cards, credit cards and the like that a customer could insert into an automatic transaction machine to obtain goods or services. It should also be understood that currency-handling-machine include, but are not limited to, gaming machines, vending machines and all other types of automatic transaction machines.

Referring again to FIG. 1, the bill acceptor 2 comprises a processing unit 4 and a memory unit 6 configured to validate the bill and determine its denomination and to execute a secured communication protocol. The processing unit 4 also provides an interface between the customer 7 and the communication channel 5. Once the bill 8 is received into the bill acceptor 2, it communicates this event by encrypting the event using a secured communication protocol. The encrypted event is sent as an encrypted transaction message to the transaction controller 3 over the communication channel 5.

The transaction controller 3 comprises a processing unit 18 and a memory unit 11 configured to execute a secured communication protocol. Once the transaction controller 3 receives the encrypted transaction message, it decrypts the message by executing the secured communication protocol. If the results of the decryption reveal that the encrypted transaction message is legitimate, and if the bill had been determined to be valid, then the display screen 9 notifies the customer 7 that a credit has been recognized. However, if the decryption analysis reveals that the encrypted transaction message is illegitimate, then a warning is generated and the customer is not issued a credit. The encryption and decryption algorithms comprising the secured communication protocol will be discussed in detail below. By using the secured communication protocol, the integrity and the authenticity of communications between the bill acceptor 2 and transaction controller 3 is achieved.

Figure 2:
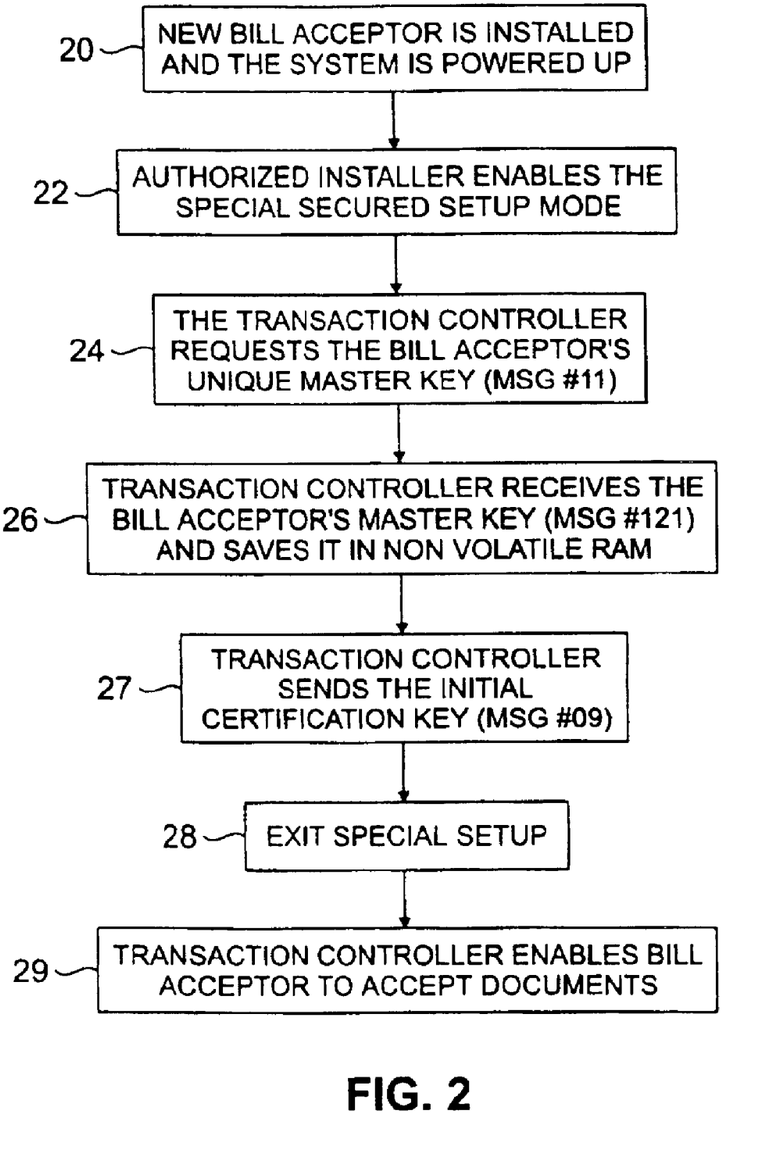
FIG. 2 is a process flow diagram illustrating the setup process for a currency-handling machine according to the present invention.

FIG. 2 illustrates the installation 20 of a new bill acceptor. Installation of the bill acceptor is limited to only authorized personnel, and once installed into the currency-handling machine, a special secured setup mode is enabled 22 by the authorized installer. During this special mode, the transaction controller requests 24 from the bill acceptor a master key signal. The master key is set to a predetermined value which is stored in the bill acceptor. As will be discussed later in more detail, the bill acceptor employs the master key when it uses the secured communication protocol to encrypt messages which it subsequently transmits to the transaction controller. Once the transaction controller receives 26 the master key, it stores it into the memory unit and retrieves the master key when it decrypts messages that it receives from the bill acceptor. Next, a special parameter called a certification-key is sent 27 to the bill acceptor from the transaction controller. The bill acceptor uses the certification key during the encryption process in order to introduce another level of security to the secured communication protocol. Once the transaction controller sends the certification-key to the bill acceptor, the special setup process is complete 28. During the last step in the setup process, the transaction controller enables 29 the bill acceptor so that it can accept and process bills from customers.

Figure 3:
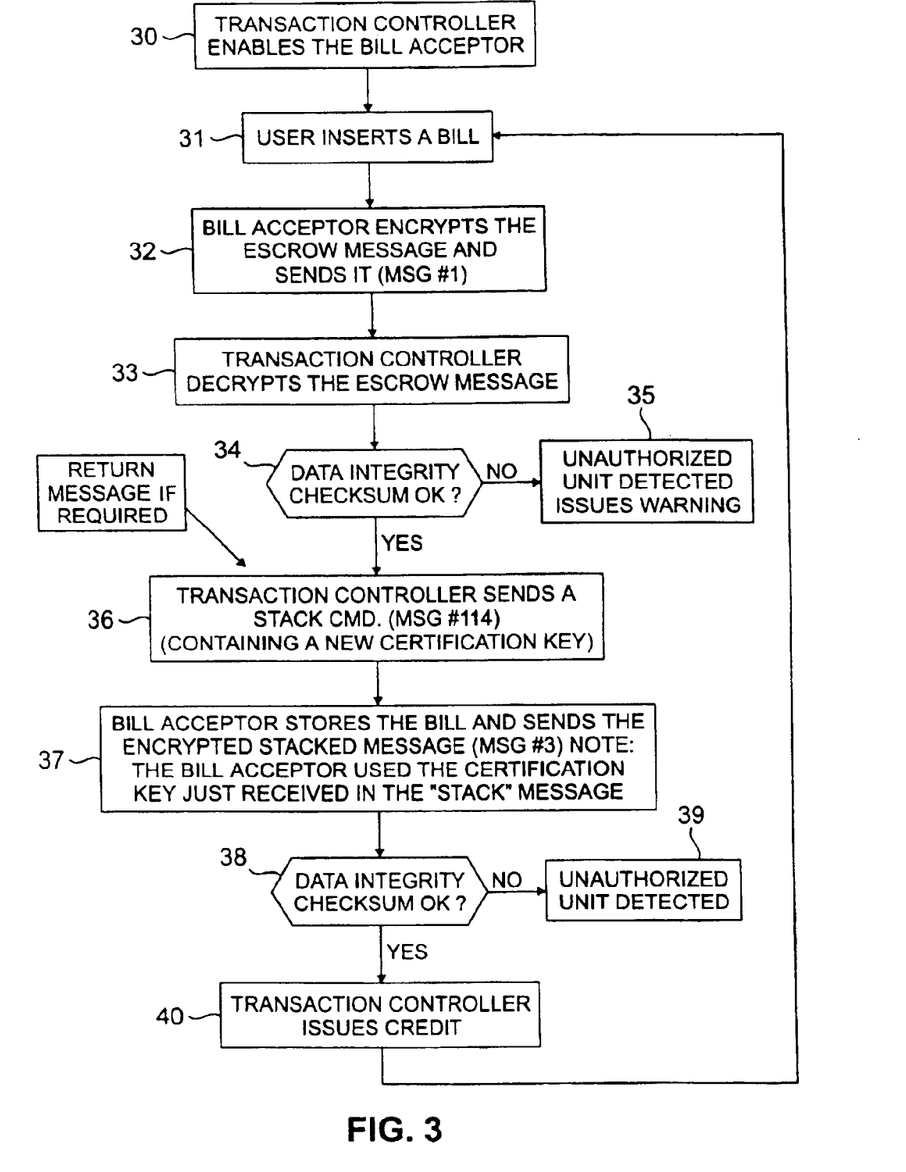
FIG. 3 is a process flow diagram illustrating the normal operation process of a currency-handling machine according to the present invention.

FIG. 3 illustrates the normal operation between a bill acceptor and a transaction controller. Once the bill acceptor has been installed and the transaction controller has enabled 30 the bill acceptor to accept bills, the currency-handling machine waits for a customer to insert 31 a bill. Typically, a user will insert a bill into the bill acceptor in exchange for the goods or services provided by the currency-handling machine. For example, if the currency-handling machine is part of a gaming machine, the customer exchanges bills for the opportunity to play a game of chance. The bill acceptor advances the inserted bill into the bill acceptor until it reaches an "escrow" position. The "escrow" position may be defined as that position within the bill acceptor where the bill is maintained as information related to the bill is processed and as a decision on the validity and denomination of the bill is formed. Although the entire bill is within the bill acceptor and beyond the customer's reach, the bill is still in a position where it can be returned to the customer if found to be invalid or counterfeit. After the bill acceptor determines that a bill is genuine, the bill acceptor formats and encrypts an "escrow" transaction message 32. The "escrow" message is formatted with denomination information derived from the bill, encrypted, and then sent to the transaction controller using the secured communication protocol. The transaction controller then receives and decrypts 33 the encrypted transaction message. It next evaluates integrity of the message by checking 34 the checksum value. If the integrity of the encrypted transaction message is questionable, a determination is made that it originated from an unauthorized bill acceptor. The transaction controller then can generate a warning, such as an audible alarm and/or record the event for authorized personnel to review at a later time. No credit is given to the user in this case. Otherwise, if the transaction controller determines that the source of the message is from an authorized bill acceptor then the transaction controller responds by transmitting a "stack" command 36 to the bill acceptor. The "stack" command instructs the bill acceptor to stack the bill in a cashbox within the bill acceptor. In addition, the command includes a new certification-key which is to be used by the bill acceptor during a subsequent encryption operation. Once the bill acceptor receives 37 the "stack" command, it responds by storing the bill in a cashbox, and encrypting and transmitting a "stack" message to the transaction controller. The bill acceptor uses the latest certification-key received from the transaction controller when it encrypts the "stack" message. Once the transaction controller receives the encrypted "stack" message from the bill acceptor, the transaction controller responds by sending an acknowledgment message acknowledging the receipt of the encrypted "stack" transaction message.

The transaction controller determines the integrity and authenticity of the encrypted "stack" message by decrypting 38 the message. If the results of the decryption process reveal that the source of the message is valid and authorized, then the transaction controller responds by transmitting a credit message 40 to the bill acceptor. The bill acceptor receives the credit message and the currency-handling machine notifies the customer of the credit status and amount. On the other hand, if the result of decrypting 39 the "stack" transmission message indicates that the source of the message is unauthorized or invalid, then the transaction controller make take appropriate action which may include sending an "invalid bill" message to the bill acceptor. No credit is given to the customer in this case. The transaction controller also can generate an audible alarm to notify authorized personnel that the security of the currency-handling machine has been breached.

Figure 4:
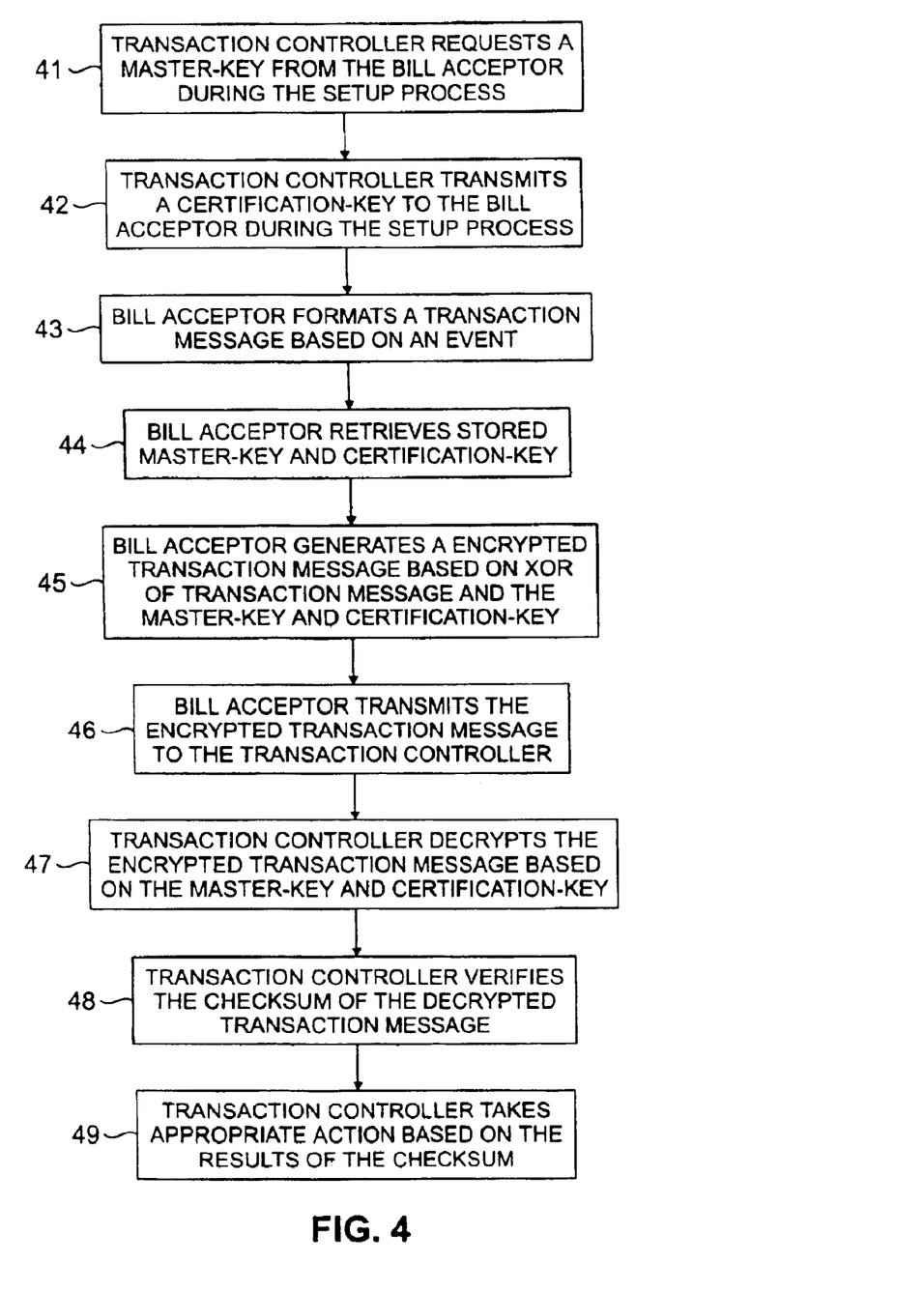
FIG. 4 is a process flow diagram illustrating one implementation of a secured communication protocol employed by a currency-handling machine according to the present invention.

FIG. 4 illustrates one implementation of a secured communication protocol. The transaction controller requests 41 from the bill acceptor, during the setup process (discussed above), the master-key which is stored in the bill acceptor. The master-key is transmitted from the bill acceptor to the transaction controller over a communications channel that is not secured. However, since the master-key is transmitted only once during the setup process by authorized personnel, it is still relatively secure. As discussed earlier, a certification-key is also transmitted 42 from the transaction controller to the bill acceptor over the unsecured communications channel during the setup process, but again, it is relatively secure. (During subsequent communications, the transaction controller sends a new certification-key to the bill acceptor which is used by the bill acceptor in subsequent communications with the transaction controller.) Then, when the bill acceptor detects an event, such as a customer inserting a bill into the bill acceptor, it responds by formatting 43 a transaction message based on the event, such as an "escrow" transaction message. Since the bill acceptor intends to communicate the transaction message to the transaction controller, it retrieves 44 the latest certification-key it had received during a prior communication with the transaction controller. The bill acceptor also retrieves 44 the master key it had previously stored in memory. The bill acceptor encrypts the message by executing the secured communication protocol 45 algorithm. The secured communication protocol algorithm may be based an exclusive-or (XOR) type of arithmetic operation. This XOR type of operation makes the transmission of the transaction message more secure. It accomplishes this by using a combination of the master-key and the certification-key. The master-key is only known to the bill acceptor and communicated to the transaction controller only during the authorized setup process. In addition, the secured communication protocol relies on the "indirection" property exhibited by the random nature of the certification-key. That is, whenever the transaction controller responds to a transaction message from the bill acceptor, the transaction controller responds by transmitting to the bill acceptor a new certification-key. The value of the certification-key is updated randomly. This technique ensures that transaction message that contains the same type of event (i.e. same bill values) will be encrypted differently. This technique also allows the transaction controller to dynamically "certify" that the bill acceptor is the original authorized unit in real time. Once the bill acceptor encrypts the transaction message, it transmits 46 the encrypted transaction message to the transaction controller over the secured communications channel.

Upon receipt of the encrypted transaction message by the transaction controller, it proceeds to determine 47 the authenticity and integrity of the encrypted transaction message. It decrypts the encrypted transaction message using a similar XOR operation that is used by the bill acceptor to encrypt the transaction message. The XOR operation is performed on the transaction message and on the combination of the master-key and the certification-key. The transaction controller maintains a copy of the master-key and the certification-key which it uses when it decrypts the encrypted transaction message. The checksum resulting from the decryption process is evaluated 48 to determine whether an authorized bill acceptor unit is present. If the checksum reveals that an unauthorized unit is present, then appropriate action 49 is taken such as generating an alarm or recording the event for later retrieval. Otherwise, if the result of the checksum indicates that the bill acceptor is authorized, the transaction controller responds in an appropriate manner such as sending a stack command to the bill acceptor.

Figure 5:
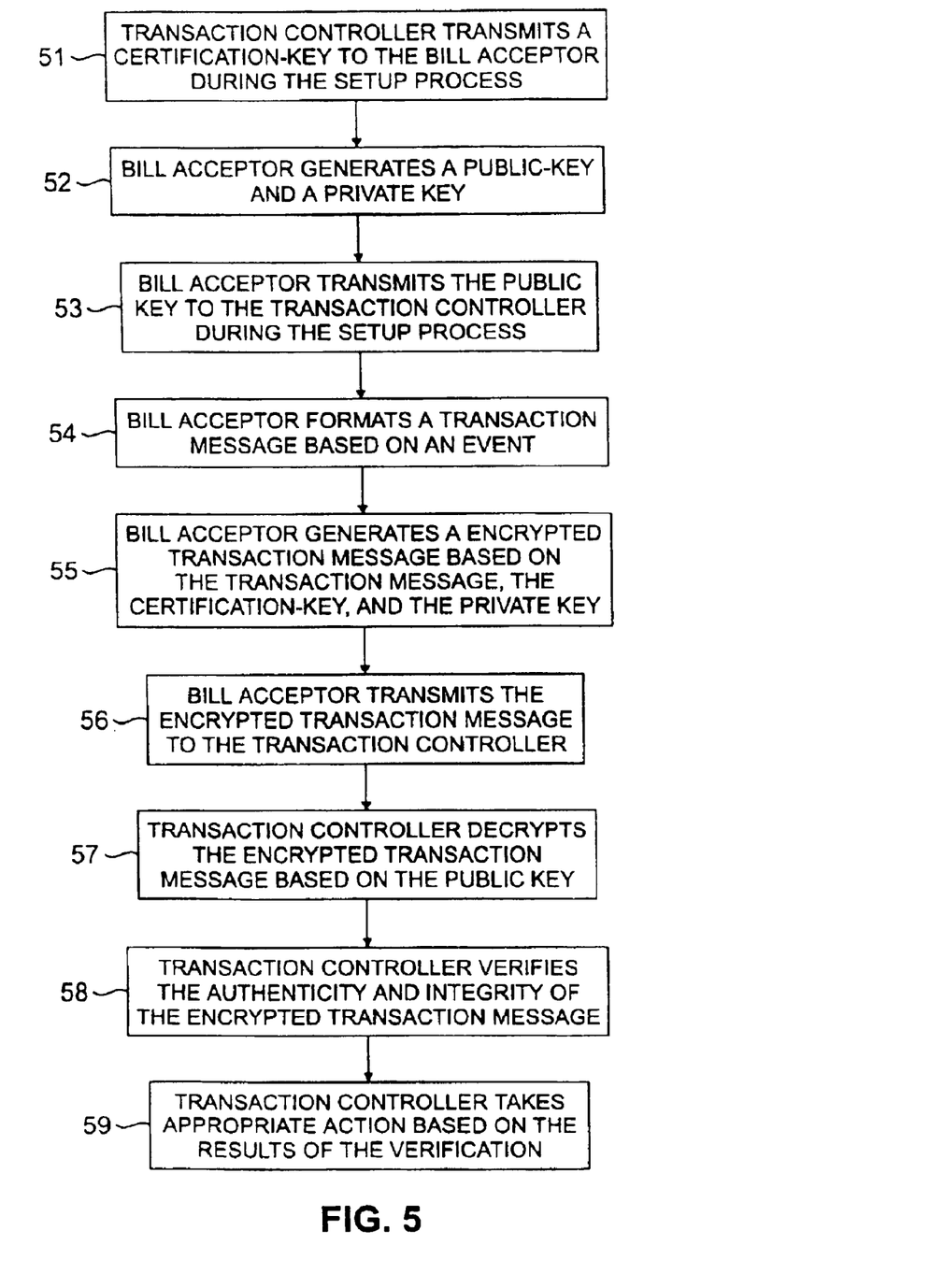
FIG. 5 is a process flow diagram illustrating another implementation of a secured communication protocol employed by a currency-handling machine according to the present invention.

FIG. 5 illustrates another implementation of a secured communication protocol. The transaction controller transmits 51 an initial certification-key to the bill acceptor during the setup process as described earlier. Although the initial certification-key sent over an unsecured communication channel, it is still relatively secure because of the environment (authorized personnel attending to connecting the bill acceptor to the automatic transaction machine) during the initial setup process. Moreover, subsequent certification-keys are transmitted to the bill acceptor from the transaction controller whenever it acknowledges the receipt of an encrypted transaction message from the bill acceptor. This assures that every subsequent communication from the bill acceptor to the transaction controller is not identical which increases the level of security in the secured communication protocol. During the setup process, the authorized bill acceptor generates 52 and maintains a public key and a private key. The public and private key may be derived from Rivest-Shamir-Adelman (RSA) standard protocol techniques known in the art. Also during the setup process, the bill acceptor transmits 53 to the transaction controller a copy of the public key which the transaction controller uses during the decryption process. When an event is generated 54 by the bill acceptor, such as a customer inserting a bill into the bill acceptor, it creates and formats a transaction message based on this event. The bill acceptor then proceeds to encrypt 55 the transaction message based on the private key, the certification-key, and the master-key. The bill acceptor begins by retrieving the private key it had previously stored. It also retrieves the certification-key that was previously sent from the transaction controller during a previous communication. It then encrypts the message using an encryption algorithm based on modulo arithmetic based RSA techniques. In addition to using the private key in the encryption algorithm, the present invention also includes the certification-key into the algorithm. The encrypted transaction message is then transmitted 56 to the transaction controller.

When the transaction controller receives 57 the encrypted transaction message from the bill acceptor, it applies the decryption algorithm of the secured communication protocol. The decryption algorithm first decrypts the encrypted transaction message to determine the authenticity of the message by evaluating the certification-key extracted from the message. Next the decryption algorithm retrieves the "message" from the transaction message using the certification-key. As described earlier, the transaction controller can take appropriate action 59 based on the results derived from the decryption algorithm.

Figure 6:
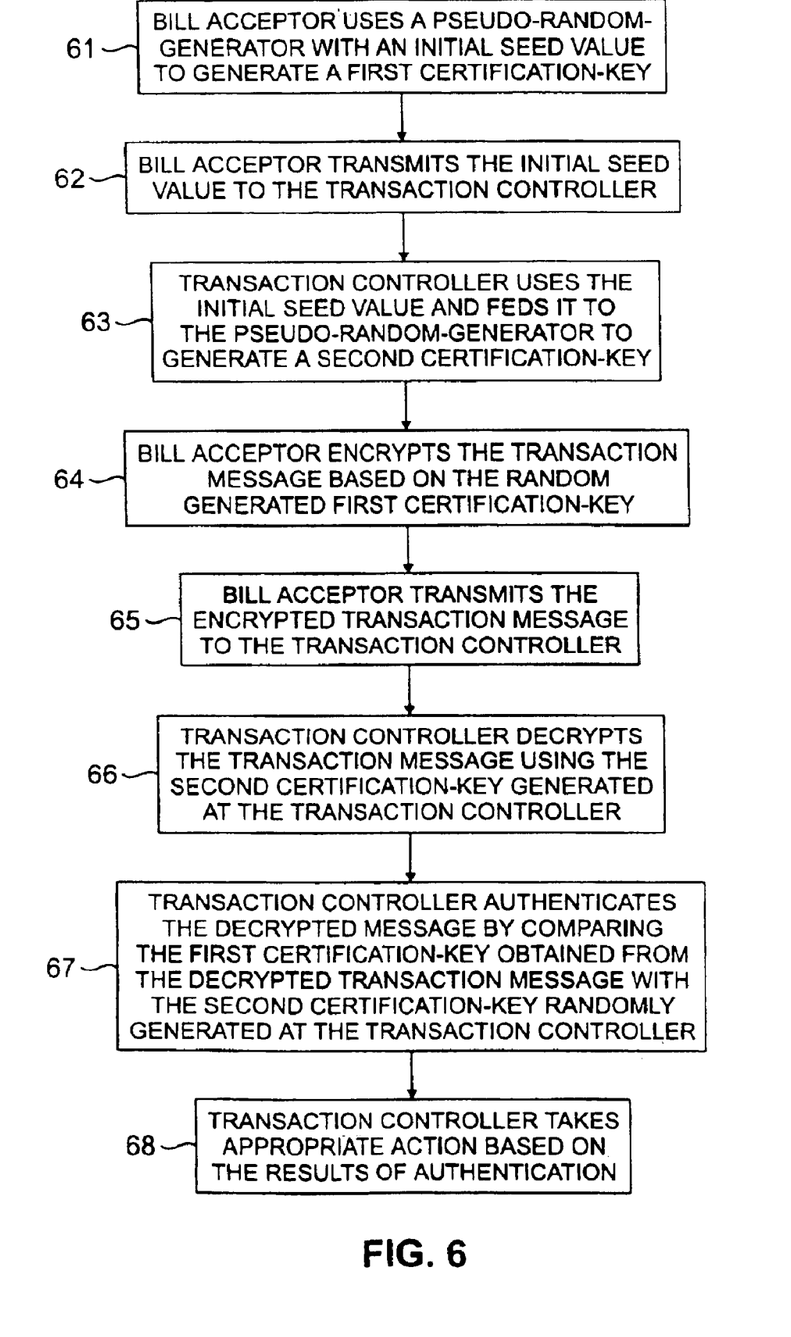
FIG. 6 is a process flow diagram illustrating another implementation of a secured communication protocol employed by a currency-handling machine according to the present invention.

FIG. 6 illustrates another implementation of a secured communication protocol. This technique allows a transaction controller to authenticate a bill acceptor without requiring the transaction controller to periodically transmit a new certification-key to the bill acceptor after the transmission of each transaction message. A pseudo-random-generator is employed in the bill acceptor and another pseudo-random-generator employed in the transaction controller are synchronized using an initial seed value. The initial seed value may be obtained during the installation of a bill acceptor in the currency-handling-machine. The bill acceptor utilizes a pseudo-random-generator to generate an initial certification-key. In general, when a computing system needs a random numerical value for processing, it will a request the services of a pseudo-random-generator. The pseudo-random-generator generates an initial numerical random value based on the initial seed value. A subsequent pseudo-random-generator request will produce a subsequent random value that is different from the previous value.

Referring to FIG. 6, the functions described in blocks 61–63 are performed during the setup process by authorized personnel while blocks 64–67 are performed during the normal operation of a bill acceptor connected to the transaction controller. The bill acceptor uses a first pseudo-random-generator to generate 61 an initial certification-key based on a predetermined seed value. This predetermined initial seed value is transmitted 62 to the transaction controller. Upon receipt of the seed value, the transaction controller produces a certification-key generated from a second pseudo-random-generator based on the seed value received from the bill acceptor. By initializing the first pseudo-random-generator in the bill acceptor and the second pseudo-random-generator in the transaction controller with the same seed value, both pseudo-random-generators are synchronized when they generate subsequent certification-keys.

Once the setup process is complete, the currency-handling machine is ready to process transaction messages as exemplified by blocks 64–67. As discussed earlier, when an event in the bill acceptor triggers a transaction, the bill acceptor responds by encrypting 64 a transaction message based on the information derived from the event. The bill acceptor encrypts the transaction message based on a certification-key generated by the pseudo-random-generator and then transmits 65 the transaction message to the transaction controller. Upon receipt of the encrypted transaction message, the transaction controller decrypts 66 the encrypted transaction message using a certification-key that was generated by the second pseudo-random-generator. In order to authenticate the source of the transaction message, the transaction controller compares 67 the certification-key generated by the second pseudo-random-generator in the transaction controller with the certification-key found in the decrypted transaction message. As discussed above, the transaction controller can then take appropriate action 68 based on the authenticity of the bill acceptor.

Figure 7:
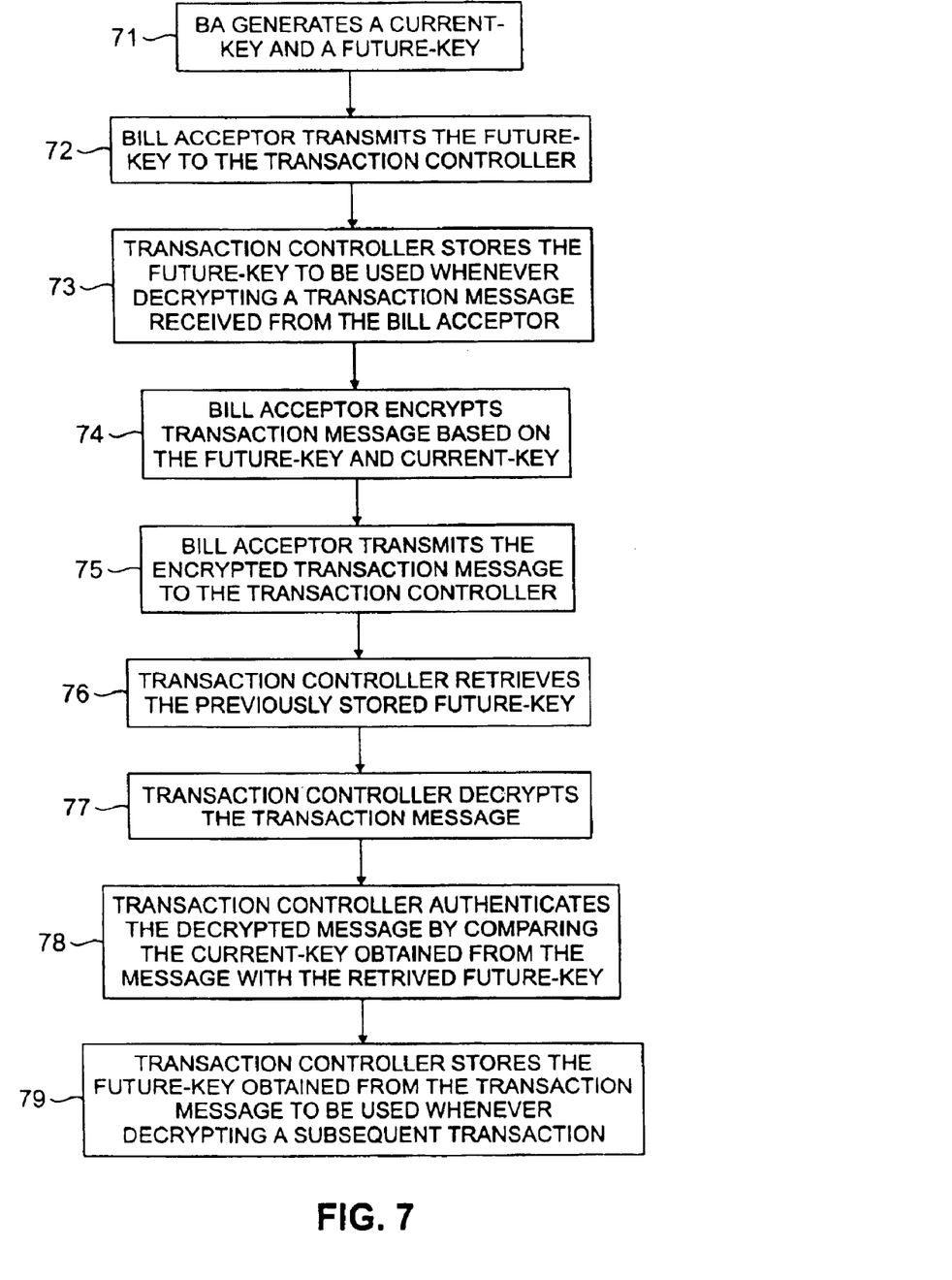
FIG. 7 is a process flow diagram illustrating another implementation of a secured communication protocol employed by a currency-handling machine according to the present invention.

FIG. 7 illustrates another implementation of a secured communication protocol. This technique also allows the transaction controller to authenticate the bill acceptor without requiring the transaction controller to periodically transmit a new certification-key to the bill acceptor after each transaction message. This technique relies on the use of a current-key and a future-key in which the future-key will be subsequently used as a certification-key during a subsequent transaction. Authorized personnel perform the functions described in blocks 71–73 during the setup process while blocks 74–79 are performed during normal operation between the bill acceptor and the transaction controller. The bill acceptor generates 71 a future-key and a current-key and then transmits 72 only the future-key to the transaction controller. Upon receipt of the future-key, the transaction controller stores it 73 in memory to be used when it decrypts an encrypted transaction message sent by the bill acceptor. Once the setup process is complete, the currency-handling machine is ready to process transaction messages as exemplified by blocks 74–79. The bill acceptor encrypts 75 a transaction message based on a current-key and a new future-key and transmits 76 the encrypted transaction message to the transaction controller. (The current-key that is used is actually the future-key that was transmitted during the setup process. The future-key in step 74 that is used is a new future-key.) The transaction controller then retrieves 76 the future-key it had previously received and stored and uses it when it decrypts 77 the encrypted transaction message. In order to authenticate the bill acceptor, the transaction controller compares 78 the current-key obtained from the encrypted transaction message with the future-key that was stored and previously received by the transaction controller. If the authentication process is successful, then the transaction controller can continue processing. It obtains 79 the new future-key from the encrypted transaction message and stores it in its memory. The transaction controller then retrieves the new future-key when decrypting the next encrypted transaction message. This stored future-key is then compared to the current-key obtained from the subsequent encrypted transaction message, and so forth as transaction events occur so that the authenticity of the bill acceptor is checked each time a transaction event occurs.

The above communications methods discussed concern the authentication of a bill acceptor performed by a transaction controller. However, one skilled in the art can apply these techniques in reverse to enable a bill acceptor to authenticate a transaction controller. A number of embodiments of the invention have been described. Nevertheless, it will be understood that various modifications may be made without departing from the spirit and scope of the invention. For example, in order to avoid the possibility that two or more bill acceptors may be configured with the same master-key, a unique identification number can be assigned to each bill acceptor. This identification number can be concatenated with the certification-key during the encryption process. Accordingly, other embodiments are within he scope of the following claims.

What is claimed is:

1. A method for securing communications in a currency-handling machine comprising:

generating an encrypted transaction message based on a transaction event originating from the bill acceptor;

communicating the encrypted transaction message from the bill acceptor to a transaction controller over a communication channel;

decrypting the encrypted transaction message within the transaction controller; and enabling the bill acceptor to accept a bill if the decrypted transaction message is authenticated.

2. The method of claim 1 wherein generating the encrypted transaction message includes applying an exclusive-or operation on at least one of a transaction message, a master-key, and a certification-key.

3. The method of claim 2 wherein the master-key is a predetermined value originating from the bill acceptor and communicated from the bill acceptor to the transaction controller over the communication channel during the initialization phase.

4. The method of claim 2 wherein the certification-key is a random value periodically communicated from the transaction controller to the bill acceptor over the communication channel.

5. The method of claim 1 wherein decrypting the transaction message includes decrypting the encrypted transaction message by applying an exclusive-or operation on at least one of an encrypted transaction message, a master-key, and a certification-key.

6. The method of claim 5 wherein decrypting the transaction message further includes checking the checksum of the encrypted transaction message.

7. The method of claim 6 further comprising disabling the bill acceptor if the result of the checksum fails.

8. The method of claim 6 further comprising sending an acknowledgement message if the result of the checksum passes.

9. The method of claim 1 wherein generating the encrypted transaction message includes applying to the transaction a modulus-based operation and using a private-key known only to the bill acceptor and a certification-key received during a previous communication with the transaction controller.

10. The method of claim 1 wherein decrypting includes applying to the encrypted transaction message a modulus-based operation and using a public key communicated from the bill acceptor to the transaction controller, wherein the result of the operation is an authentication value used to authenticate the source of the encrypted transaction message.

11. The method of claim 10 wherein decrypting further comprises applying a further modulus-based operation on the authentication value using the public-key and the certification-key, wherein the result of the operation is a data value used to evaluate the encrypted transaction message.

12. A method of securely installing a bill acceptor in a currency-handling machine comprising:

connecting a bill acceptor to a transaction controller;

enabling a secured setup mode to operate in the bill acceptor;

transmitting a master-key code from the bill acceptor to the transaction controller;

processing the master-key code in the transaction controller and generating a certification-key; and transmitting the certification-key to the bill-acceptor to enable the bill-acceptor to operate.

13. A method of operating a currency-handling machine in a secure environment comprising:

generating an escrow message in response to an insertion of a bill into a bill acceptor;

encrypting the escrow message using a secured communication protocol, wherein the escrow message is formatted based on information derived from the bill;

communicating the encrypted escrow message from the bill acceptor to the transaction controller;

decrypting the escrow message using a secured communication protocol;

verifying the integrity of an escrow checksum of the decrypted escrow message;

sending a stack command to the bill acceptor, wherein the stack command includes a new certification-key, if the result of an escrow checksum reveals an authorized bill acceptor;

storing the bill and acknowledging the stack command by sending an encrypted stack message to the transaction controller;

receiving the stack message into the transaction controller;

decrypting the stack message using a secured communication protocol;

verifying the integrity of a stack checksum of the decrypted stack message; and sending a credit command to the bill acceptor, wherein the credit command includes a new certification-key, if the result of the checksum reveals an authorized bill acceptor.

14. A method of claim 13 further comprising generating a warning and disabling the bill acceptor if the result of at least one of the escrow checksum and the stack checksum reveals an unauthorized bill acceptor.

15. A method of securing communications between a transaction controller within a currency-handling machine and a bill acceptor comprising:

requesting a master-key from the bill acceptor during the setup process;

transmitting a certification-key to the bill acceptor during the setup process;

generating a formatted transaction message based on an event originating at the bill acceptor;

retrieving the certification-key and the master-key at the bill acceptor;

generating an encrypted transaction message based on a exclusive-or operation on at least one of the master-key and the certification-key at the bill acceptor;

receiving the encrypted transaction message;

decrypting the encrypted transaction message based on the exclusive-or operation on at least one of the master-key and the certification-key; and verifying and taking an appropriate action based on the integrity of the checksum of the result of decrypting the encrypted transaction message.

16. A method of securing communications between a transaction controller within a currency-handling machine and a bill acceptor comprising:
- transmitting a certification-key to the bill acceptor during the setup process;
- generating a public-key and a private-key within the bill acceptor;
- receiving the public-key from the bill acceptor;
- generating an encrypted transaction message based on the private-key and the certification-key at the bill acceptor;
- decrypting the encrypted transaction message based on the public-key; and
- verifying the authenticity of the encrypted transaction message using the certification-key.

17. A method of securing communications between a transaction controller within a currency-handling machine and a bill acceptor comprising:
- generating a certification-key at the bill acceptor during the setup process, wherein the certification-key is generated by a pseudo-random-generator with an initial seed value;
- receiving the initial seed value from the bill acceptor during the setup process;
- generating a certification-key during the setup process, wherein the certification-key is generated by a pseudo-random-generator with an initial seed value received from the bill acceptor;
- generating an encrypted transaction message at the bill acceptor based on the certification-key;
- decrypting the encrypted transaction message based on the-certification-key, where the certification-key is generated by a pseudo-random-generator at the transaction controller; and
- verifying the authenticity of the encrypted transaction message by comparing the certification-key generated by the pseudo-random-generator in the transaction controller with the certification-key obtained from encrypted transaction message.

18. The method of 17 wherein a certification-key is subsequently generated at the bill acceptor when a subsequent transaction message is encrypted, and a certification-key is subsequently generated at the transaction controller when the subsequent transaction message is decrypted.

19. A method of securing communications between a transaction controller within a currency-handling machine and a bill acceptor comprising:
- generating at the bill acceptor a current-key and a future-key during the setup process;
- receiving the future-key during the setup process;
- storing the future-key during the setup process;
- generating at the bill acceptor an encrypted transaction message based on the current-key and the future-key;
- decrypting the encrypted transaction message based on the future-key, where the future-key is retrieved from the previously stored future-key; and
- verifying the authenticity of the encrypted transaction message by comparing the future-key which was previously obtained and retrieved from the transaction controller with the current-key obtained from the encrypted transaction message.

20. The method of claim 19 wherein decrypting includes obtaining from the encrypted transaction message a future-key and storing the future-key at the transaction controller to be used when decrypting a subsequent transaction message containing a current-key and a new future-key, and wherein the current-key obtained from the subsequent decrypted transaction message is to be compared with the future-key previously stored at the transaction controller.

21. A secure bill handling apparatus comprising:
- a bill acceptor including a processor and memory for authenticating bills and generating and encrypting data; and
- a transaction controller connected to the bill acceptor, wherein the transaction controller is associated with the currency-handling machine, and wherein the transaction controller includes a processor and memory for decrypting and authenticating data received by the bill acceptor, and responding to the bill acceptor based on the result of the authenticity of the data received from the bill acceptor.

22. The apparatus of claim 21 wherein the bill acceptor encrypts the transaction message based on the exclusive-or operation using a master-key and a certification-key, and wherein the transaction controller decrypts the encrypted transaction message based on the exclusive-or operation using the master-key and the certification-key.

23. The apparatus of claim 21 wherein the bill acceptor encrypts the transaction message based on a private-key and a certification-key, and wherein the transaction controller decrypts the encrypted transaction message based on the public-key.

24. A method for securing communications in a currency-handling machine comprising:
- generating an encrypted transaction message based on a transaction event;
- communicating the encrypted transaction message from a bill acceptor to a transaction controller over a communication channel;
- decrypting the encrypted transaction message; and
- enabling the bill acceptor to accept a bill if the decrypted transaction message is authenticated.

25. The method of claim 24 wherein generating the encrypted transaction message includes applying an exclusive-or operation on at least one of a transaction message, a master-key, and a certification-key.

26. The method of claim 25 wherein the master-key is a predetermined value, and the certification-key is a random.

27. The method of claim 24 wherein decrypting the transaction message includes decrypting the encrypted transaction message by applying an exclusive-or operation on at least one of an encrypted transaction message, a master-key, and a certification-key.

28. The method of claim 27 wherein decrypting the transaction message further includes checking a checksum of the encrypted transaction message.

29. The method of claim 28 further comprising at least one of disabling the bill acceptor if the result of the checksum fails, and sending an acknowledgement message if the result of the checksum passes.

30. The method of claim 24 wherein generating the encrypted transaction message includes applying to the transaction a modulus-based operation using a private-key and a certification-key that was received during a previous communication.

31. The method of claim 24 wherein decrypting includes applying to the encrypted transaction message a modulus-based operation using a public key and wherein the result of the operation is an authentication value used to authenticate the source of the encrypted transaction message.

32. The method of claim 31 wherein decrypting further comprises applying a further modulus-based operation on the authentication value using the public-key and a certification-key, wherein the result of the operation is a data value used to evaluate the encrypted transaction message.

33. The method of claim 1 wherein the transaction message is authenticated by evaluating a certificate key extracted from the decrypted message.

* * * * *